United States Patent [19]

Secoura et al.

[11] 4,249,310

[45] Feb. 10, 1981

[54] ARRANGEMENT FOR PROTECTING A ROTARY DEVICE FROM IMPACT THRUST FORCES

[75] Inventors: Ralph J. Secoura, Baltimore; Thomas J. Howard, Jr., White Marsh, both of Md.

[73] Assignee: Black & Decker, Inc., Towson, Md.

[21] Appl. No.: 934,745

[22] Filed: Aug. 21, 1978

[51] Int. Cl.³ ............................................. A01D 50/00
[52] U.S. Cl. ........................................ 30/276; 56/12.7
[58] Field of Search .................. 30/347, DIG. 7, 276; 56/12.7

[56] References Cited

U.S. PATENT DOCUMENTS

| | | | |
|---|---|---|---|
| 2,742,694 | 4/1956 | Stone | 30/347 X |
| 4,047,299 | 9/1977 | Bair | 30/347 X |
| 4,161,820 | 7/1979 | Moore | 56/12.7 |
| 4,167,812 | 9/1979 | Moore | 56/12.7 |

Primary Examiner—Jimmy C. Peters
Attorney, Agent, or Firm—Frank J. Thompson; Edward D. Murphy; Leonard Bloom

[57] ABSTRACT

A means is described for restraining axial movement of an output shaft of a prime mover which protects the prime mover from undesired axial impact loads applied thereto. The protective means comprises a first body mounted to a rotating output shaft for motion in an axial direction upon the application of a thrust force to the body and a second body which is stationary relative to the output shaft. Means bias the bodies apart and enables mutual engagement therebetween which restricts movement between the bodies in an axial direction when an impact force is applied to the first body.

10 Claims, 4 Drawing Figures

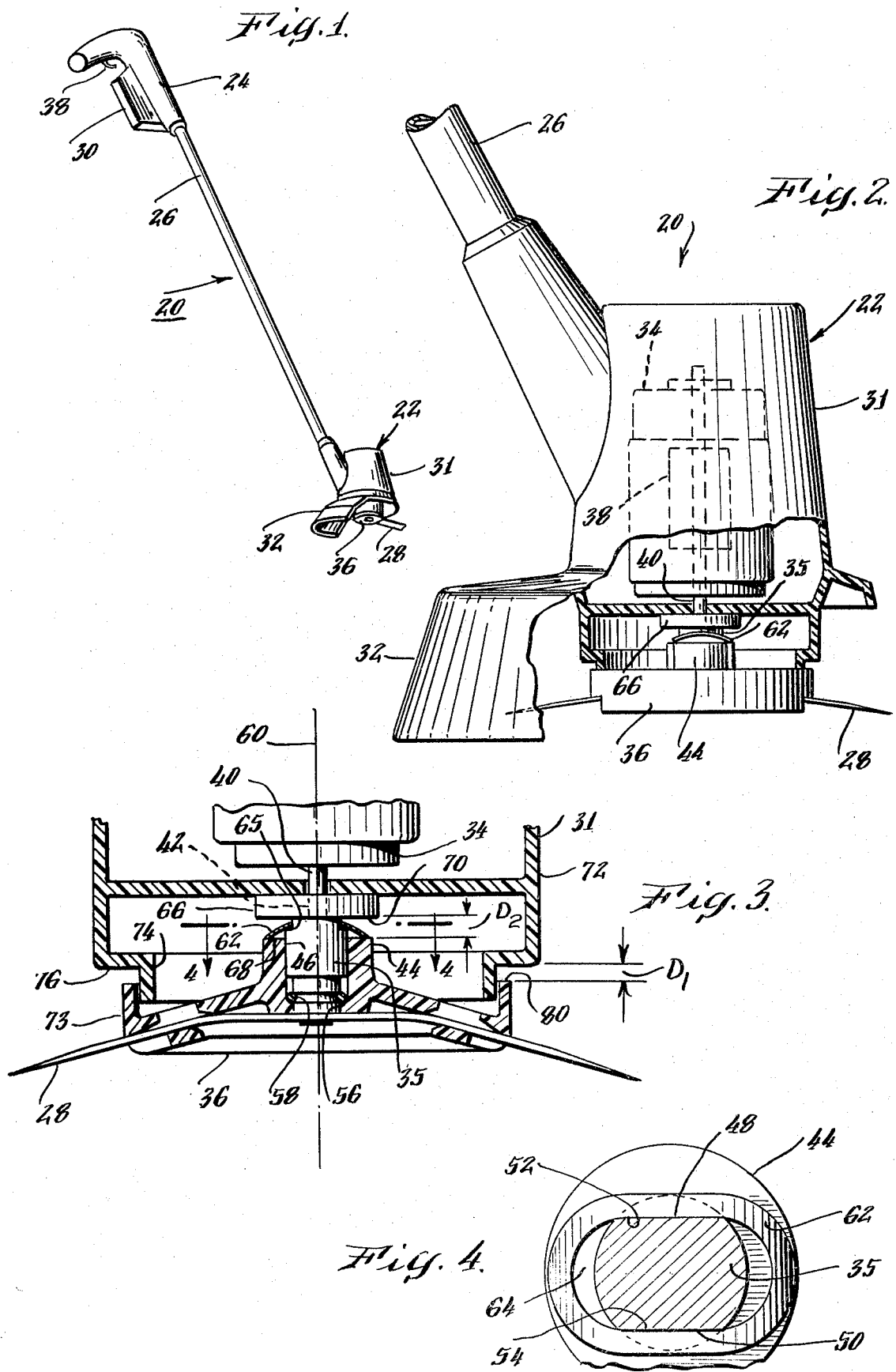

ARRANGEMENT FOR PROTECTING A ROTARY DEVICE FROM IMPACT THRUST FORCES

BACKGROUND OF THE INVENTION

1. Field of the Invention

This invention relates to a means for inhibiting the application of damaging axial forces to a rotary device. The invention relates more particularly to a grass cutting device having a rotating shaft and means for protecting a rotary motive means from damaging axial forces inadvertently applied to the shaft.

2. Description of the Prior Art

In various devices employing a prime mover having an output rotary shaft, axial forces are at times applied to the shaft which can have a damaging effect on the prime mover. This can occur for example with an electric motor which rotates a tool or cutter or the like. More particularly, in the field of consumer products wherein large production quantities of an appliance or device are manufactured, the cost factor is particularly important and efforts are generally taken to provide designs having desired operating characteristics and reliability yet at the lowest design cost achievable. In this regard, in various electrically operated devices as for example electrically operated lawn mowers or grass trimmer devices, it is desirable from a cost viewpoint to utilize electric motor means in which the supports for the motor are designed to handle rotary loads but are not specificially designed to sustain axial thrust or impact loads. While a significant cost saving can be achieved with this arrangement, the device is at times undesirably subjected to relatively strong axial impact forces which can have a damaging effect on the motor. Although thrust bearings may be provided to compensate for these loads which at times can be significant, the loads are random and from a cost viewpoint do not warrant the inclusion in the motor design of relatively expensive thrust bearings. This is the case for example with portable grass trimming devices which are generally held and manipulated by the user above the ground during the process of cutting and trimming the grass. The user will, at times, inadvertently impact a cutter support hub of the device with a rock or other structure in a manner which causes an axial thrust load which can have a damaging effect on the electric motor.

SUMMARY OF THE INVENTION

Accordingly, it is an object of this invention to provide a means for inhibiting the application of damaging axial thrust forces to a prime mover.

Another object of the invention is to provide a means for protecting an electric motor from axial forces applied to a body mounted to a rotary shaft thereof.

Another object of the invention is to provide an improved grass trimmer having an electrically energized motor and means for inhibiting tht application of damaging thrust forces to the motor.

Another object of the invention is to provide a relatively low cost means for inhibiting damaging thrust forces on an electric motor.

A further object of the invention is to provide a grass trimmer having a relatively low cost motor yet which is protected from axial thrust forces imposed thereon.

Another object of the invention is to provide an electric motor without thrust bearings and means for inhibiting a damaging effect from thrust forces imposed on the motor.

A further object of the invention is to provide an improved grass cutter device.

Another object of the invention is to provide an improved grass trimmer having an electric motor for rotating a cutter hub and means for protecting the electric motor from damaging thrust forces applied to the hub.

In accordance with the general aspect of the invention, a means is provided for inhibiting the transmission to an output shaft of a prime mover of axial thrust forces applied to a body mounted to the shaft. The protective means includes a first body mounted to a rotary output shaft of a prime mover for motion thereon in an axial direction upon application of a thrust force to the body and a second body which is stationary relative to the output shaft. The first and second bodies include means for providing a mutual engagement therebetween which restricts movement between the bodies in an axial direction. A means is provided for biasing apart the first and second bodies in order to inhibit engagement between the bodies during rotary motion of the shaft and for enabling engagement of the bodies when an axial force is applied to the shaft. In a more particular arrangement, the first body is mounted for rotation with the shaft and the biasing means resiliently biases apart the first and second bodies during rotation.

In accordance with more particular features of the invention, the prime mover comprises an electric motor of a grass trimmer device having an output shaft. A rotable hub for supporting and rotating a grass cutter is mounted to the output shaft. A resilient biasing means is provided which biases the hub apart from a housing member of the trimmer. The housing member and the hub are configured for mutual engagement and for restricting motion of the hub in an axial direction upon engagement. In a more particular embodiment of the invention, the biasing means comprises a resilient disc which is positioned about the rotating shaft.

BRIEF DESCRIPTION OF THE DRAWINGS

These and other objects and features of the invention will become apparent with reference to the following specification and to the drawings wherein:

FIG. 1 is a perspective view of a grass trimming device utilizing an embodiment of the invention;

FIG. 2 is an enlarged, partly broken away, partly sectional, side elevation view of the grass trimmer of FIG. 1;

FIG. 3 is an enlarged cross sectional view of part of the trimmer of FIG. 2 illustrating one embodiment of the invention; and, FIG. 4 is a view taken along the line 4—4 of FIG. 3.

DETAILED DESCRIPTION

Referring now to the drawings and particularly to FIGS. 1 and 2, rotary blade grass trimmer device 20 is shown to comprise a cutter head means 22, a gripping handle 24 and an elongated tubular rod 26 for positioning the cutter head means 22 at a convenient distance from the handle. The handle is preferably held by the user at or below waist level for positioning the cutter head means 22 adjacent the ground. The grass trimmer 20 is a portable, electrically energized, cordless type wherein energy for exciting an electric motor and thereby actuating a blade 28 of the cutter head is provided by a battery power pack 30, which is mounted to the device.

The cutter head means is illustrated in greater detail in FIG. 2 and includes a housing body 31, a protective shroud 32 which is integrally formed with the housing member 31 and a prime mover comprising an electrically energized motor means 34 having a rotatable output shaft 35. A first body 36 comprising a hub is mechanically coupled to the output shaft for rotation thereof. Blade 28 is mounted to the hub 36 and upon actuation of a switch 38 mounted on the handle 24, electrical energy is applied from the battery pack 30 to the motor means 34 through electrical wires, not shown, extending through the rod 26 for imparting rotary motion to the hub 36. The motor 34 includes a rotor 38 having a rotor shaft 40 which is press fitted to a bore 42 of the output shaft 35. A more detailed explanation of the blade mounting is given in copending U.S. patent application Ser. No. 934,746 which is filed concurrently herewith and which is assigned to the assignee of this invention.

A means for mounting the hub body 36 to the output shaft 35 is provided. The hub 36 includes an integrally formed shaft mounting segment 44 which is generally cylindrical shaped. A drive coupling bore segment 46 is formed having a cross-sectional configuration for engaging the output shaft 35 for imparting rotary motion to the hub. The cross-sectional configurations of the segment 46 and the shaft 35 are best illustrated in FIG. 4. Hub segment 46 includes flat segments 48 and 50. The output shaft 35, which is generally cylindrically shaped, includes flats 52 and 54 formed thereon for engaging the hub flats 48 and 50 respectively. The flats on the output shaft 35 and on the hub mounting segment 46 impart rotary motion to the hub when the shafts 40 and 35 rotate. Cylindrically shaped output shaft 35 extends into a lower cylindrical hub mounting segment 56 and engages the hub 36 at that location. The engagement is provided by an O ring 58 which is positioned in a groove formed on a distal segment of the shaft 35. The O ring 58 establishes a resilient interference fit between the shaft 35 and a lower cylindrical wall surface of the hub mounting segment 56. A circular ledge, not illustrated for purposes of clarity in the drawing, is formed in the wall of segment 56 at an axial position immediately above the O ring as viewed in FIG. 3 which further restricts downward axial movement of the hub on the shaft. This mounting arrangement restrains the hub 36 on the shaft 35 while enabling the hub 36 to be displaced axially upwardly in the direction of a longitudinal axis 60 as viewed in FIG. 4 when a thrust force is applied to it. It also facilitates removal of the hub from the output shaft 35 for cleaning of accumulated grass and debris, if any. The hub can thus be conveniently removed from the shaft by hand pressure applied in a downward direction as viewed in FIG. 3 to overcome a restraining force established by the O ring and ledge. The hub 36 is conveniently refitted on and mounted to the shaft 35 with firm hand pressure and the interference fit provided by the O ring and the ledge will retain the hub on a shaft during the cutting operation.

For purposes of reducing the fabrication cost of the motor 34, thrust bearings for sustaining impact loads in the direction of the longitudinal axis 60 are not provided. Since the trimmer 20 is portable, at times it is inadvertently manipulated by the user to impact a rock or other structure. More particularly, the trimmer 20 is positioned by the handle 24 and in positioning the cutter head means 22, the hub 36 can inadvertently strike a rock which impact applies substantial thrust forces to the motor 34.

A means is provided for biasing apart the housing body 31 and the hub body 36 for inhibiting engagement between these bodies during rotary motion of the output shaft 35 and for enabling engagement between these bodies when an axial force is applied to the hub which forces the hub in an axial direction. After initial axial movement of the hub resulting from the impact force causes engagement, the engagement of these bodies transmits the impact force to the housing 31 and restricts further movement between them in an axial direction thereby inhibiting damage to the motor. More particularly, a means for biasing apart the bodies comprises a resilient means formed by a disc shaped body 62 of resilient material which is positioned about the output shaft 35. The body 62 which is formed of any suitable spring material is preferably configured to have an aperture 64 formed therein having flat segments conforming with the flats 52 and 54 of the output shaft 35. The body 62 fits snugly about shaft 35 and is restrained axially by a shoulder 65 formed integrally in the shaft 35. The biasing means is positioned for biasing apart the housing body 31 which is stationary relative to the output shaft 35 and the hub body 36. This is provided in the embodiment illustrated in the drawings by positioning the spring body 62 about the output shaft 35 between a shoulder segment 66 of the output shaft 35 and a radially extending surface segment 68 of the cylindrical hub segment 44. A resilient biasing force is thereby established between a lower surface 70 of the shoulder segment and the surface 68 of the hub segment which spaces apart the shoulder segment and the hub segment.

The housing body 31 and the hub body 36 include means for providing mutual engagement therebetween which restricts relative movement between the bodies in an axial direction. Housing body 31 includes a cylindrically shaped housing segment 72, of first diameter, and within which housing segment, the output shaft 35 and hub segment 44 are positioned. The housing body 31 further includes a second cylindrical segment 74 having a diameter of less than that of segment 72 and a circular shoulder segment 76. The hub 36 is generally circular shaped and includes a longitudinally extending wall segment 73 having an inside diameter which is greater than an outside diameter of the housing segment 74 and less than the outside diameter of the housing segment 72. The hub 36 can therefore be freely rotated without interference with the segment 74 of the housing body 31. The application of an impact thrust force to the hub 36 will cause the hub body 36, which as indicated can be axially displaced, to advance in the direction of the longitudinal axis 60 toward the housing body 31. Radial surface segment 80 of the hub wall segment 73 will contact and engage the housing shoulder segment 76 under the influence of this applied force. The hub 36 is mounted on the shaft 35 for providing an axial spacing $D_1$ between the hub surface 80 and the shoulder 76 upon rotation of the hub body. The auxiliary shaft 35 and the hub segment 44 are sized to provide that, in a normally mounted position, the spacing $D_2$ between the surface 68 of the hub segment 44 and the lower surface 70 of the shoulder 66 is greater than $D_1$. Thus, the surface 80 will engage the shoulder 76 before the surface 68 or hub segment 44 engages the surface 70 of shoulder 66 of the output shaft 35. An impact thrust force applied to the hub 36 is thereby transmitted to the housing body 31 rather than to the shaft 35 and 40. Accordingly, damaging effects of this force on the motor 34 are avoided.

There has thus been described an improved arrangement for protecting a prime mover such as an electric motor from damage caused by impact forces applied thereto in an axial direction. The described improvement enables the advantageous use of relatively low cost motors in grass trimmers while avoiding damage to the motor which might otherwise be caused by impact shock.

While there has been described a particular embodiment of the invention, it will be appreciated by those skilled in the art that variations may be made thereto without departing from the spirit of the invention and the scope of the appended claims.

What is claimed is:

1. In a prime mover having a rotary output shaft, an arrangement for inhibiting movement of the shaft in an axial direction upon application of a force to a body positioned on the shaft comprising:
   (a) a first body;
   (b) means for mounting said first body to said output shaft for rotation therewith and for movement of said first body in an axial direction on said shaft when a thrust force is applied to said body;
   (c) a second housing body which is stationary;
   (d) said first and second bodies spaced apart in an axial direction and including means for providing mutual engagement therebetween upon the application of a force to said first body, said engagement means restricting movement of said first body in an axial direction upon engagement with said housing body and transferring to said housing body a force applied to said first body;
   (e) said housing body adapted to receive a force in said axial direction which is transferred thereto without applying said force in an axial direction to said shaft; and,
   (f) means for biasing apart said first and second bodies for inhibiting engagement therebetween during rotary motion of said shaft and for enabling engagement when an axial force is applied to said first body.

2. The improvement of claim 1 wherein said first body is mounted for rotation with said output shaft and said biasing means resiliently biases said first body from said stationary second body.

3. In an electrical appliance having an electric motor and a rotating output shaft, an improved arrangement for restraining axial movement of said shaft comprising:
   (a) a hub body;
   (b) means for mounting said hub body on said shaft for rotation therewith and for movement in an axial direction on said shaft upon application of a thrust force to said hub body;
   (c) a housing body which is stationary;
   (d) said hub and housing bodies spaced apart in an axial direction and having means for providing mutual engagement therebetween upon the application of a force to said hub body, said engagement means restricting movement of said hub body in an axial direction upon engagement with said housing body and transferring to said housing body a thrust force applied to said hub body;
   (e) said housing body adapted to receive a force in said axial direction which is transferred thereto without applying said force in an axial direction to said shaft; and,
   (f) means for biasing apart said bodies in an axial direction for inhibiting engagement therebetween and for enabling engagement when an axial force is applied to said hub body.

4. The appliance of claim 3 wherein said biasing means comprises a resilient biasing means.

5. In a grass trimmer device, an improvement for restricting axial movement of an output shaft of an electric motor comprising:
   (a) a housing body;
   (b) an electric motor means positioned in said housing;
   (c) said motor means including an output shaft;
   (d) handle and rod means for positioning said housing adjacent the ground;
   (e) a rotatable hub body for supporting a grass cutter;
   (f) means for mounting said hub body to said shaft for rotation therewith and for rectilinear movement on said shaft in an axial direction toward said housing body upon application of a force to said hub body;
   (g) said hub and housing bodies spaced apart in an axial direction and having means formed thereon for providing mutual engagement therebetween upon application of a force to said hub body, said engagement means restricting the movement of said hub body in an axial direction upon engagement of said bodies and transferring a force applied to said hub body to said housing body;
   (h) said housing body adapted to receive a force in said axial direction which is transferred thereto without applying said force in an axial direction to said shaft; and,
   (i) means for biasing apart said hub and housing bodies during rotary motion of said shaft and for enabling engagement when an axial force is applied to the hub.

6. The grass trimmer of claim 5 wherein said biasing means comprises resilient means positioned between said housing and said hub.

7. The grass trimmer of claim 6 wherein said biasing means comprises an annular resilient body positioned about said drive shaft.

8. The grass trimmer of claim 7 wherein said annular resilient body comprises a resilient disc.

9. The grass trimmer of claim 7 including an annular drive shaft surface and said resilient body is positioned between said surface and said hub.

10. The grass trimmer of claim 5 wherein said biasing means restrains motion of said hub in a first axial direction and said mounting means include means for restraining motion of said hub in a second axial direction.

* * * * *